March 22, 1960  F. A. TUPTA  2,929,067
CHUCK AND DRIVER FOR HOLDING AND DRIVING A TACK
Filed April 24, 1959

INVENTOR.
FRANK A. TUPTA
BY
ATTORNEYS

United States Patent Office 2,929,067
Patented Mar. 22, 1960

2,929,067

CHUCK AND DRIVER FOR HOLDING AND DRIVING A TACK

Frank A. Tupta, Cleveland, Ohio

Application April 24, 1959, Serial No. 808,660

2 Claims. (Cl. 1—47)

The invention relates to a chuck and driver for holding and driving a tack and more particularly to a chuck and driver for holding and driving a thumbtack.

An object of the invention is the provision of a chuck which is adapted to hold a tack while driving the tack into wood or other material.

Another object of the invention is the provision of resilient fingers for gripping the head of the tack for holding same while it is being driven into wood or other material.

Another object of the invention is the provision of a chuck which is detachably connected to the end of a handle whereby different size chucks may be replaceably attached to the handle for holding tacks having head of different diameters.

Another object of the invention is the provision of a chuck holding the head of a tack whereby the tack will not become misaligned while it is being driven into wood or other material.

Thumbtacks may be obtained in the stores on a pad into which the tacks are driven and an object of the present chuck is to engage the head of the tack by depressing the chuck thereagainst whereby the chuck automatically engages the head and enables the operator to remove the tack from the pad in readiness to drive the tack into wood or other material.

Other objects and a fuller understanding of the invention may be had by referring to the following description and claims taken in conjunction with the accompanying drawing, in which:

Figure 1:
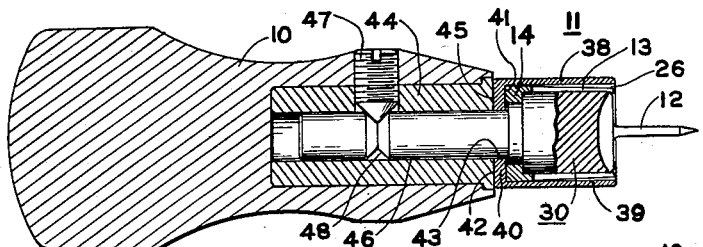
Figure 1 is an enlarged cross-sectional view of a chuck and driver embodying the features of the invention being substantially double scale.
Figure 2:
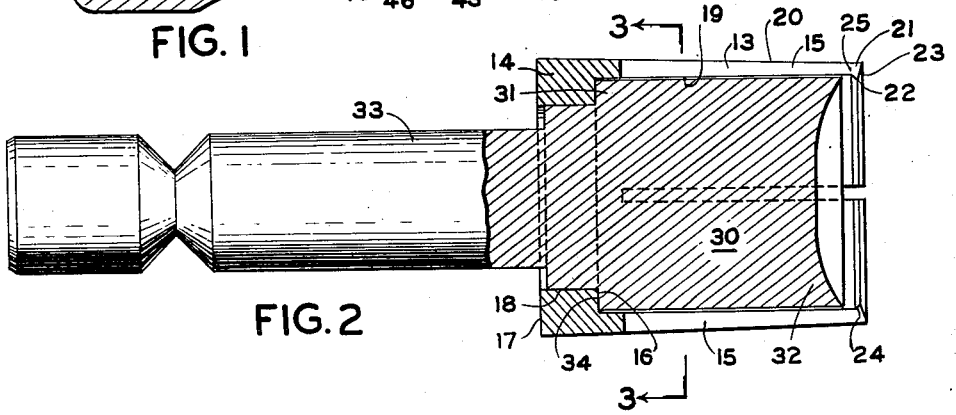
Figure 2 is a further enlarged view of the chuck assembly.
Figure 3:
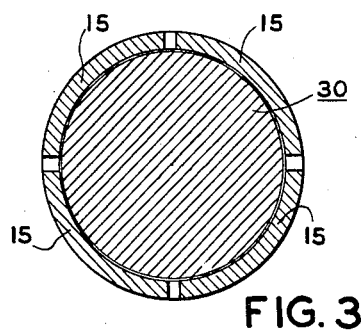
Figure 3 is a cross-sectional view taken along the line 3—3 of Figure 2.

With reference to the drawings, the invention comprises a handle 10 to which is attached a chuck assembly 11 for holding a thumbtack 12. The chuck for holding the head of the tack is designated by the reference character 13 and comprises an annular collar 14 and resilient fingers 15. The annular collar 14 has an inner surface 16 and an outer surface 17. The resilient fingers 15 are attached to the inner surface 16. The fingers 15 have free end portions 21. The annular collar 14 has an opening 18 extending therethrough. The resilient fingers 15 have an inside surface 19 and an outside surface 20.

The free end portions 21 of the fingers have internally thereof an inwardly extending rib 22 defining a chuck to hold the head of the thumbtack. The rib 22 has an internal dimension less than that of the inside surface 19 of the fingers, and has an entrance receiving surface 23 in advance thereof and a gripping surface 24 in rearward thereof. The entrance receiving surface 23 is preferably at an angle of about 75 degrees with the axis of the chuck and defines a converging taper to receive the head of the tack. The gripping surface 24 is preferably at an angle of about 45 degrees with the axis of the chuck and defines a diverging taper to hold the head of the tack. The gripping surface 24 merges into the inside annular surface 19 of the fingers 15 and defines a juncture 25 therewith. Mounted inside of the resilient fingers is an anvil body 30 having a shank 33. The anvil body has a rearward end 31 and an outer end 32. The shank 33 has a smaller diameter than the anvil body 30 and is connected to the rearward end 31 thereof and defines with said rearward end a shoulder 34. The shoulder 34 of the anvil body 30 fits against the inside surface 16 of the collar 14, with the shank 34 extending through the opening 18 in the collar. The outer end 32 of the anvil 30 is contoured to match the top surface of the head of the tack. The outer anvil surface 32 of the anvil meets the gripping surface 24 of the rib 22 and the inside annular surface 19 of the fingers at substantially a juncture 25 in order to hold the head of the tack therein. A cylindrical shield 38 having an internal diameter 39 surrounds the outside annular surface 20 of the fingers with a small clearance 26 therebetween so that the fingers may move outwardly when receiving the head of the tack. The shield 38 has at the rearward end an in-turned flange 40 provided with inside and outside surfaces 41 and 42 with an opening 43 extending therethrough. The outer surface 17 of the collar engages the inside surface 41 of the inturned flange and the shank 33 extends through the opening 43 of the in-turned flange.

The handle 10 has an attachment portion or sleeve 44 provided therein. The sleeve 44 has an end abutting surface 45 and an aperture 46 extending thereinto. The aperture 46 is adapted to receive the shank 43 with the outside surface 42 of the in-turned flange 40 engaging the end abutting surface 45. The shank 33 has an annular groove 48 into which a screw 47 extends for holding the chuck, the anvil body 30, and the shield 38 as a unit on the handle 10.

While the present application shows one chuck assembly, it is to be understood that there are several sizes of chuck assemblies which may be detachably mounted to the handle for holding and driving thumbtacks having different size heads. In changing one size chuck assembly for another, it is only necessary to unloosen the screw 47 and remove the chuck assembly from the handle and mount a different size chuck assembly therein after which the screw may be again tightened. In operation, the operator pushes the end of the chuck assembly against the head of the tack which is mounted on the purchase pad, whereby the rib 22 engages the head of the tack. After the rib 22 engages the head of the tack, the operator may pull the tack out of the purchase pad by lifting up on the handle. The tack is now ready to be driven into the wood or other material. The relationship of the parts of the chuck assembly in this invention is such that the tack does not become crooked or misaligned during the driving operation which enables the operator to do a job having excellent appearance.

Figure 4:
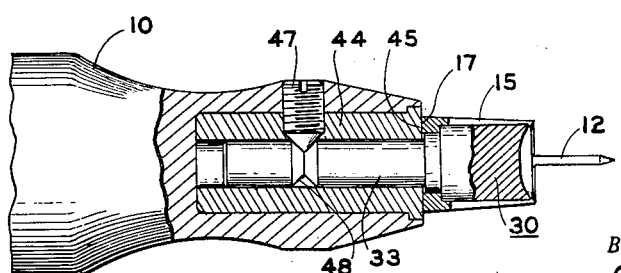
Figure 4 is a modified form of the chuck assembly of Figure 1.

The Figure 4 shows the chuck assembly with the shield 38 omitted. In this embodiment of the invention, the outer surface 17 of the annular collar abuts against the abuttable surface 45 of the sleeve 44.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A chuck and driver for holding and driving a tack comprising, a hollow chuck having an annular collar and a plurality of resilient fingers, said annular collar having inner and outer surfaces and an opening extending therethrough, said resilient fingers having inside and outside annular surfaces and projecting from said inner surface of said annular collar and having free end portions, said free end portions having internally thereof an inwardly extending rib defining a chuck to hold the head of a tack, said rib having an internal dimension less than that of said inside annular surface of said fingers and having an entrance receiving surface in advance thereof and a gripping surface in rearward thereof, said receiving surface defining a converging taper to receive the head of a tack and said gripping surface defining a diverging taper to hold the head of a tack, said gripping surface merging into said inside annular surface of said fingers and defining a juncture therewith, a driving head comprising an anvil body and a shank member, said anvil body having a rearward end and an outer end, said shank member having a smaller diameter than said anvil body and being connected to said rearward end thereof and defining with said rearward end a shoulder, said anvil body fitting within said inside annular surface of said hollow chuck with said shoulder engaging said inner surface of said collar and with said shank member extending through said opening in said collar, said outer end of said anvil body having an anvil surface contoured to match the top surface of a tack head, said anvil surface meeting said gripping surface and said inside annular surface of said fingers at substantially said juncture, a handle having an end attachment portion provided with an end abutting surface, said end attachment portion having an aperture extending thereinto to receive said shank with said outer surface of said collar engaging said end abutting surface of said attachment portion, and means extending into said handle to engage said shank for holding said chuck and said driving head as a unit on said handle.

2. A chuck and driver for holding and driving a tack comprising, a hollow chuck having an annular collar and a plurality of resilient fingers, said annular collar having inner and outer surfaces, said resilient fingers having inside and outside annular surfaces and projecting from said inner surface of said annular collar and having free end portions, said free end portions having internally thereof an inwardly extending rib defining a chuck to hold the head of a tack, said rib having an internal dimension less than that of said inside annular surface of said fingers and having an entrance receiving surface in advance thereof and a gripping surface in rearward thereof, said receiving surface defining a converging taper to receive the head of a tack and said gripping surface defining a diverging taper to hold the head of a tack, said gripping surface merging into said inside annular surface of said fingers and defining a juncture therewith, a driving head comprising an anvil body having a rearward end and an outer end, said anvil body fitting within said inside annular surface of said hollow chuck with said rearward end engaging said inner surface of said collar, said outer end of said anvil body having an anvil surface contoured to match the top surface of a tack head, said anvil surface meeting said gripping surface and said inside annular surface of said fingers at substantially said juncture, a handle having an end attachment portion, and means on said handle to engage said chuck for holding said chuck and said driving head as a unit on said handle.

No references cited.